March 6, 1934.   J. DE LA CIERVA   1,950,080
AIRCRAFT OF THE ROTATIVE WING TYPE
Filed Sept. 1, 1932   2 Sheets-Sheet 1
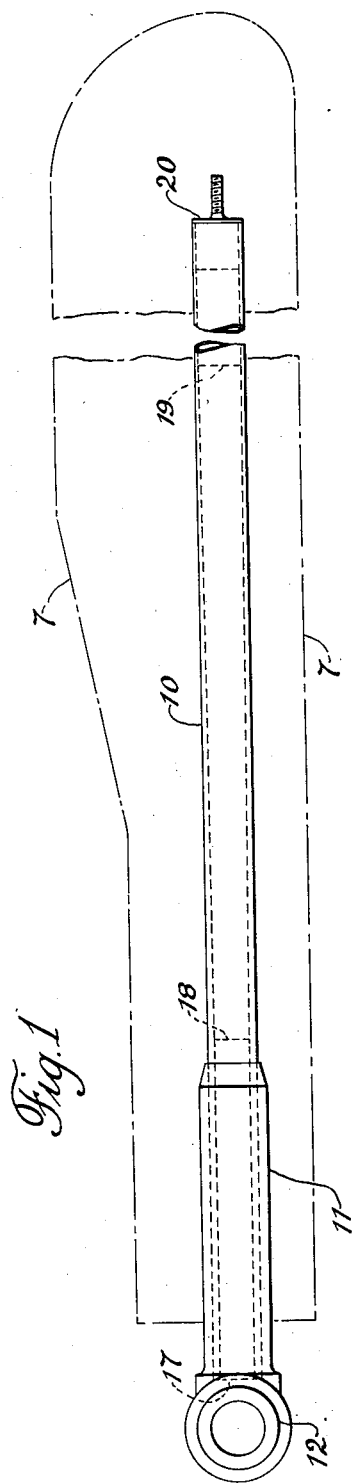
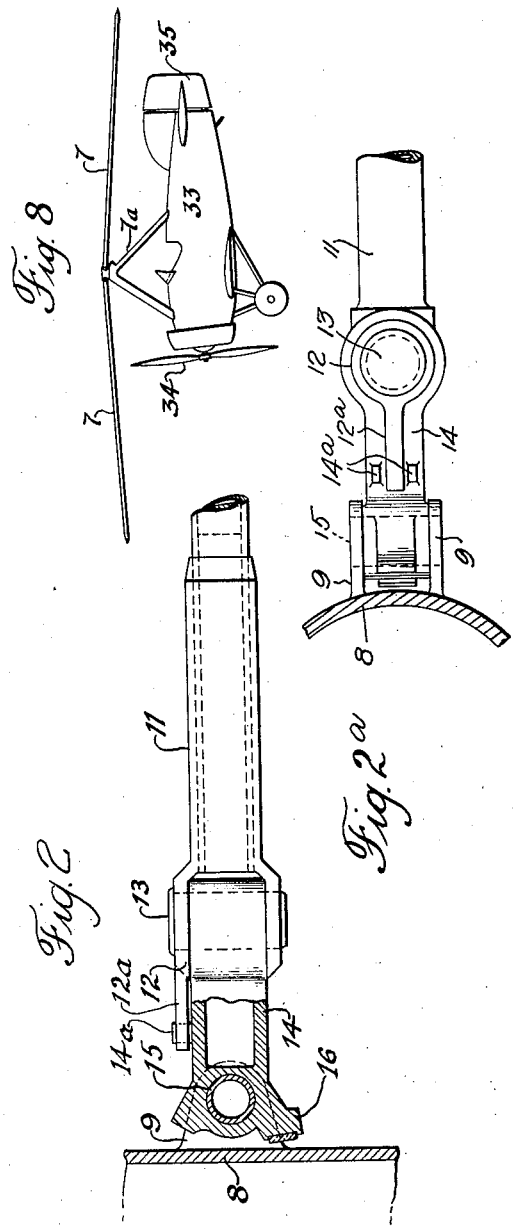
INVENTOR
Juan de la Cierva
BY
ATTORNEYS

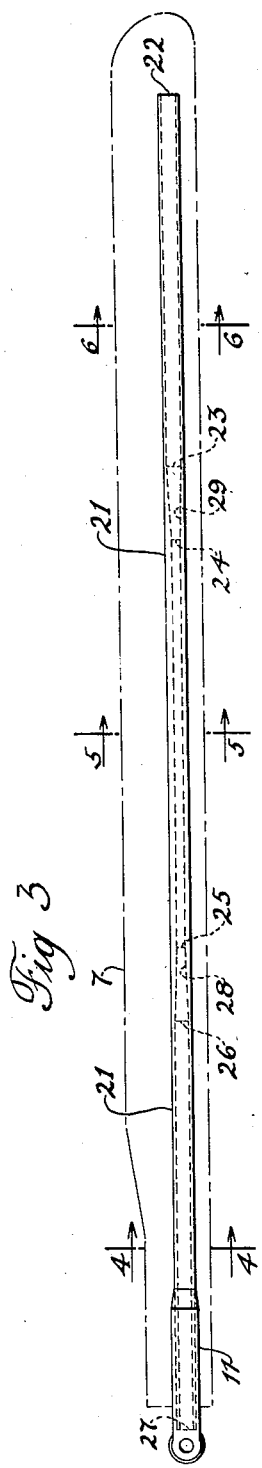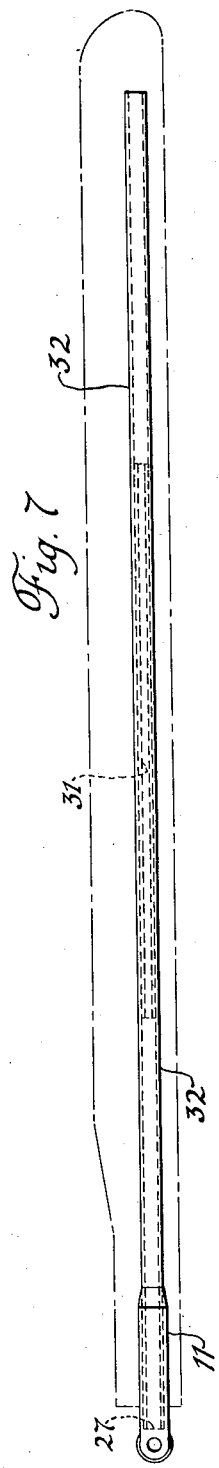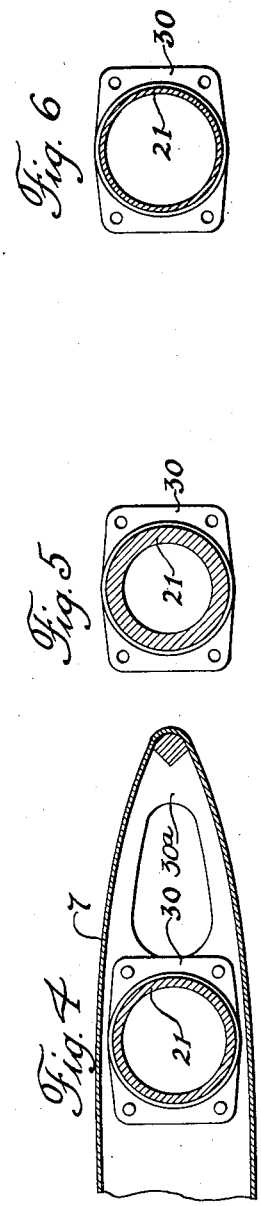

Patented Mar. 6, 1934

1,950,080

UNITED STATES PATENT OFFICE 1,950,080

AIRCRAFT OF THE ROTATIVE WING TYPE

Juan ᴜ. la Cierva, Madrid, Spain, assignor to Autogiro Company of America, Philadelphia, Pa., a corporation of Delaware Application September 1, 1932, Serial No. 631,356
In Great Britain September 10, 1931

24 Claims. (Cl. 170—164)

This invention relates to aircraft of a type having, as its primary means of sustension, a system of rotatively mounted sustaining wings or blades which are normally actuable by relative airflow in flight, the wings further being joined to a common axis structure for individual displacement or oscillative movements to compensate for variations in relative inertial and aerodynamic forces in flight. The invention, furthermore, is especially directed to certain structural features of the blades or wings themselves and their pivotal mounting arrangements.

Generally considered, it is an object of the present invention to construct sustaining blades or wings of the type referred to, more especially the main longitudinal structural members thereof, in such manner as more efficiently to utilize the weight and strength of the materials employed by a variable distribution of weight and strength in different sections of the wings lengthwise thereof.

One of the more specific objects of this invention is involved in increasing the strength of the root or inner end of a rotative or sustaining wing of the pivotally mounted type, and to utilize, in combination with such an arrangement, a supporting device of a cantilever type to prevent excessive drooping or downward displacement of the wing when the rotor system is at rest, or not rotating at flight speeds.

In considering another object of the invention it is first noted that the wings or blades of a normally wind driven and pivotally mounted sustaining system of the character referred to are subject to variations in the location of the center of lift or center of pressure as between the advancing and retreating sides of the rotor. The magnitude of the lifting force also varies and I have found that the region in which the greatest bending moments to which the wing structure is subjected in flight operation, particularly in a plane perpendicular to its chord, is located approximately mid-way between the inner and outer ends of the wing. With this in mind, I propose to increase the strength of the main longitudinal structural member or spar of such a wing in the central region thereof as compared to the inner and outer portions, this being in direct contrast to prior practice wherein the main longitudinal strength member took the form of a tubular spar of uniform wall thickness throughout the length of the blade. To accomplish the foregoing, I prefer to increase the strength of the spar in a central region thereof by increasing the wall thickness only internally of the spar, so as to leave the external diameter uniform throughout its length and thus facilitate assembly and attachment of other structural elements incorporated in the wing.

Other objects and advantages, as well as those hereinbefore referred to, will appear more clearly from a consideration of the following description, making reference to the accompanying drawings, in which—

Fig. 1 is a plan view of the main spar structure of a rotative wing constructed in accordance with this invention, a central section of the blade being broken out and the plan form of the wing itself being indicated in dot and dash lines;

Fig. 2 is a side elevational view of the spar structure of Fig 1, this view further including wing mounting and attachment means at the root end; and Fig. 2a is a plan of the same;

Fig. 3 is a plan view similar to Fig. 1, but showing the full length of a modified spar;

Figs. 4, 5 and 6 are sectional views taken as indicated by the lines 4—4, 5—5 and 6—6 on Figure 3;

Fig. 7 is a fragmentary view of still another modified form of spar; and

Fig. 8 is a somewhat diagrammatic view, on a relatively small scale, of an aircraft of the type to which the present invention relates, the wings of the sustaining rotor being in drooped position.

Referring first to Figs. 1 and 2, a portion of an axis or mounting structure is indicated by the reference numeral 8. This structure, of course, is rotatively mounted and is provided with pairs of apertured lugs or ears such as shown at 9 for the purpose of attaching the several blades of the rotor. As clearly seen in these two views, the main structural element of the wing or blade takes the form of a tubular metallic spar 10 which, at its inner end, is fitted into a strengthening sleeve 11 having apertured forks 12 at the root for cooperation with a substantially vertically extending pivot pin 13. An extension member or block 14 cooperates with pivot pin 13 and also with the horizontal pivot 15 which serves to connect the wing to its pair of apertured ears 9. The element 14 also carries an abutment or stop 16 which is adapted to contact with the spindle or axis part 8 when the rotor is not operating at flight speeds or when the blades are at rest, the purpose, of course, being to avoid excessive droop or downward swinging of the blades about their horizontal pivots 15. In addition to the foregoing, the extension block 14 is also preferably provided with an abutment or stop 14a adapted to cooperate with stop levers or arms 12a projecting inwardly from the blade fork 12. In the preferable arrangement, a pair of arms 12a will be provided and spaced toward opposite sides of the abutment 14a in order to limit or control blade swinging movements about the substantially upright or vertical pivot pin 13.

In considering the structure of the spar itself (as shown in Figs. 1 and 2), it will be noted that the thickness of the wall of the spar varies as between different portions of the wing. Specifically, the wall thickness is at a maximum between the inner end 17 and the point 18. Proceeding outwardly the wall thickness is tapered and becomes progressively thinner to the point 19. From the point 19 out to the tip 20 the spar thickness is at a minimum. The outline of a wing is shown in dot and dash lines at 7 in Fig. 1 and while a portion of the blade is shown as being broken out, it should be understood that the distance between the inner end 17 of the spar and the point 19 represents approximately the inner quarter of the blade length of which approximately the inner third is of maximum thickness (spar section 17 to 18).

To consider various advantages of the structure above described, it might be noted that heretofore it has been common to employ cables or the like for supporting the blades or wings as against excessive downward movement, such cables ordinarily being attached to an upward extension of the axis structure and also to the spars at points spaced substantially from their root ends. Since no very great bending moments result from the use of such supports, the tubular spars of uniform thickness throughout their length, as employed heretofore, had strength sufficient to avoid excessive bending of the blades when they were supported by the droop cables. However, in accordance with this invention, the aerodynamic characteristics and efficiency of the rotor are improved very materially by replacing the droop cables or the like with a cantilever stop disposed closely adjacent to the rotor hub itself so as to permit streamlining therewith, and employing a spar structure of increased strength toward its inner end. This is preferably accomplished by using a strengthening sleeve telescopically associated with the inner end of the blade spar. The supporting element 16 and the spar structure thus cooperate in providing a cantilever support which will prevent excessive bending in the blades when at rest. The increased wall thickness of the tubular spar also improves the support and the taper from point 18 to point 19 further enhances the strength of the wing in the region subject to relatively great bending moments when supported in cantilever fashion, without, however, unnecessarily increasing the weight of the spar in outer portions of the wing, as would result by use of a spar of uniform dimensions throughout its length.

In Fig. 8 I have illustrated a craft of the character hereinbefore referred to including the body or fuselage 33, a forward propeller 34 and a rudder 35. The sustaining wings 7 are shown as being mounted at the top of a pylon structure 7a and in positions assumed when at rest, in which positions, even though angled or drooped downwardly, the strength and rigidity of the spar structure described is sufficient to prevent excessive bending, so that ample clearance is left between the rotor and other portions of the craft, such, for example, as the propeller 34 and the rudder 35.

In considering the modified arrangement of Figs. 3 to 6 inclusive, it should first be noted that the region in which the wing is subjected to the greatest bending moments, as a result of relative inertial and aerodynamic forces in flight, is located substantially mid-way between the inner and outer ends thereof. With this in mind, and also bearing in mind the conditions considered above in connection with cantilever support of the wing, the tubular spar 21 of the modification of Figs. 3 to 6 inclusive is divided generally into three sections, each one of which preferably has a different wall thickness and each constituting approximately one-third of the spar length. In the outer one-third, from the tip 22 to point 23, the wall thickness is at a minimum as shown, for example, in Fig. 6. In the intermediate region, between points 24 and 25, the wall thickness is at a maximum, as shown in Fig. 5, while in the inner section between points 26 and the inner end 27 of the spar, the thickness of the wall is intermediate that of Figs. 5 and 6 (see Fig. 4). From Fig. 3 it will be seen that the intermediate and inner spar sections are joined by a tapered portion 28 and also that the intermediate and outer sections are joined by a tapered portion 29.

The wing spar of Fig. 3, as in Figs. 1 and 2, is also fitted with a strengthening sleeve 11 which is similar in all essential respects to that already described and, in connection with both forms of wing above considered, attention is called to the fact that the several sections or regions of different wall thickness in the spar are obtained by tapering only the inside or internal wall. This is of material advantage or importance not only in facilitating the use of strengthening sleeves such as indicated at 11, but also in materially simplifying the assembling and securing of other blade structural elements such as the cross pieces or ribs 30a, which are secured by flanged collars 30 indicated in Figs. 4, 5 and 6.

In accordance with the showing of Fig. 7, the spar arrangement is somewhat similar to that of Fig. 3, although in this instance the section of maximum strength and thickness is obtained by inserting a sleeve or tube 31 inside a spar element 32 which may conveniently be of uniform wall thickness throughout its length, or, if desired, of increased thickness toward its root end, as suggested in figures previously described. This modification, of course, is of advantage since more simplified tubular elements may be employed.

In considering some of the advantages of my improved wing structures, attention is called to the fact that in the preferred arrangement, as illustrated in the several views of the drawings, the wing is of substantially uniform chord throughout a major portion of its length so as to facilitate the use of a maximum number of ribs of uniform size, and I contemplate additionally enhancing the uniformity of the blade structural elements by employing spar structures of uniform outside diameter throughout at least a major portion of the length thereof, even though the wall thickness tapers or varies as between different sections in order to utilize the weight and strength of the materials with maximum efficiency. It is also noted that toward the inner end of the wing where the cross sectional dimension of the wing is somewhat reduced, I provide increased strength in the spar structure either by the use of a strengthening sleeve or by increasing the wall thickness.

From the foregoing it should be apparent that the present invention contemplates much more accurate distribution of the weight and strength of the main longitudinal spar structure, so as to provide maximum blade or wing strength with minimum total weight. The invention, furthermore, is of material advantage not only in properly distributing the strength of the spar as between different portions of the blade in order adequately to care for bending moments set up in flight, but further in cooperating with a blade support for use when the blades are at rest and thus afford adequate strength as against excessive downward flexure or droop.

While I have illustrated spar structures primarily formed of continuous tubular elements, it should be understood that at least many features of the invention may, with equal facility, be incorporated in a spar structure of a built up type, such as might be employed for the rotative wings of relatively large craft.

I claim:—

1. In a rotative sustaining wing system for aircraft, a substantially elongated autorotatable aeroform wing, a flexible mount for the wing adjacent the root end thereof providing for movements of the wing in addition to its air-actuated rotation, means restricting the range of such movements, and a main longitudinal spar structure extending throughout a major portion of the wing length, said structure being in the form of a metallic tubular element, the walls of which taper to provide increased thickness toward the root end of the wing, whereby the stresses due to the wing's autorotation, and to said other movements and restrictions thereof, are effectively cared for.

2. In a rotative sustaining wing for aircraft, a main longitudinal spar structure extending throughout the major portion of the wing length, said structure being in the form of a metallic tubular element having inner and outer walls, one of the walls of which tapers to provide increased thickness toward the root end of the wing, and a strengthening sleeve telescopically associated with the other wall and located adjacent the root end of the spar structure.

3. In a rotative sustaining wing system for aircraft, an elongated wing having an upright rotative axis and an oscillative or pivotal mounting on the said axis, and a main longitudinal spar structure extending throughout the major portion of the wing length, said structure being in the form of a metallic tubular element, the walls of which taper to provide increased thickness toward the root end of the wing, and a strengthening sleeve telescopically associated with the root end of the spar structure having wing pivot mounting means formed integrally therewith.

4. For a rotative aircraft sustaining wing, a tubular metallic spar the walls of which vary in thickness in different portions thereof to provide increased strength in one portion as compared with another portion, the tube being of substantially uniform outside diameter.

5. For aircraft, a rotative sustaining wing including a tubular spar structure as its primary longitudinal structural means, the spar structure being of increased wall thickness intermediate the ends thereof to provide increased strength in the wing toward the center.

6. For aircraft, a rotative sustaining wing including a tubular spar structure as its primary longitudinal structural means, the spar structure being of increased wall thickness intermediate the ends thereof to provide increased strength in the wing toward the center, and the root end of the spar structure having walls of increased thickness as compared to the outer end thereof.

7. In a rotative sustaining wing for aircraft, a tubular metallic spar forming the main longitudinal structural element of the wing, said spar having increased wall thickness in a region intermediate its end portions, and a strengthening sleeve telescopically associated with the root end of the spar.

8. In a rotative sustaining wing for aircraft, a tubular metallic spar forming the main longitudinal structural element of the wing, said spar having increased wall thickness in a region intermediate its end portions, and a strengthening sleeve telescopically associated with the root end of the spar, said sleeve having blade pivot mounting means associated therewith.

9. In a rotative sustaining wing for aircraft, a tubular spar structure having approximately a third of its length adjacent the middle thereof, strengthened by increased thickness in its walls as compared with its end portions, and a strengthening sleeve telescopically associated with the root end of the spar along an extended section thereof but terminating at a point spaced substantially from said middle portion of increased wall thickness.

10. For an aircraft, an upright rotative axis structure, a sustaining wing mounted for movement about the axis of said structure and for pivotal movements generally transverse the rotative path of travel, a cantilever stop device reacting between the axis structure and the wing adjacent the root end of the latter, a tubular metallic spar forming the primary structural element of the wing, and a strengthening sleeve telescopically associated with the root end of said spar and connected with the pivotal mounting for the wing on the axis structure.

11. For an aircraft, an upright rotative axis structure, a sustaining wing mounted for movement about the axis of said structure and for pivotal movements generally transverse the rotative path of travel, a cantilever stop device reacting between the axis structure and the wing adjacent the root end of the latter, and a tubular metallic spar forming the primary structural element of the wing, said spar having strengthening means in a region adjacent the pivotal mounting and supporting stop device of the wing.

12. For aircraft, an autorotative sustaining wing having a root end portion of reduced chord dimension as compared with the chord in an outer portion of the wing, the pitch of both portions being substantially uniform, and a main longitudinal spar structure of tubular form having greater wall thickness throughout at least a major part of said root end portion as compared with the wall thickness in an outer portion of the wing.

13. For aircraft, an autorotative sustaining wing of very long plan form and substantially uniform chord throughout at least a major portion of the wing length and having also a portion of reduced chord toward its inner or root end, and a main longitudinal strength structure for the wing stiffened, as against transverse flexure, to different degrees in different portions of the wing, there being a portion of increased stiffness in the region of the wing having reduced chord as compared with said portion of substantially uniform chord.

14. For an aircraft, a sustaining rotor including a normally freely rotative hub structure, a cantilever wing positioned to be normally rotated by relative flight wind about the axis of said structure, said wing being materially stiffened over an extended inner portion as compared with the tip portion thereof, means of pivotal connection at the root end of said wing to said structure including means providing for some up and down swinging of the wing under variable flight forces produced under the influence of relative air-flow, and a cantilever stop device at the root end of the wing serving as the sole means of support of said wing against excessive downward drooping when not rotating.

15. In a rotative sustaining wing for air-craft, a tubular spar structure having approximately a third of its length toward the middle thereof strengthened as compared to its end portions.

16. In aircraft of the rotative wing type having means of forward propulsion, a sustaining rotor mounted for normally free rotation about an upright axis, including an elongated, autorotative, aeroform wing the structure of which is stiffer, as against bending, in an intermediate portion of the wing than in an end portion thereof.

17. In aircraft of the rotative wing type having means of forward propulsion: a sustaining rotor mounted for normally free rotation about an upright axis, including an elongated, autorotative, aeroform wing the structure of which is stiffer, as against bending, in an intermediate portion of the wing than in the outer end or tip portion thereof; pivotal mounting means adjacent the root end of the wing positioned to provide for substantially free up and down swinging of the wing under the influence of variable flight forces, as the wing rotates; and means for supporting said wing adjacent its root end only, as against excessive downward swinging on said pivot when at rest; said wing further being materially stiffened at the root end portion thereof; by which arrangement, on the one hand, adequate freedom of wing movement is provided to accommodate the variable flight forces encountered thereby in each cycle of revolution during forward flight under the influence of said propulsion means and a subtantially straight wing form from end to end thereof is maintained and thus also an efficient autorotational attack of the wing relative to the air even under considerable variations of pressure and of the center of pressure; and on the other hand, adequate support of the wing from the root end is assured when the wing is at rest, so as to prevent its drooping or bending to a point where it might foul on any part of the aircraft.

18. For an aircraft, an autorotative sustaining rotor comprising: an upright axis structure mounted for normally free rotation; a plurality of elongated aeroform wings so positioned as to be autorotated about said axis under the influence of relative air-flow; a generally horizontal or transverse pivot, and a generally vertical or upright pivot, for each wing, for mounting or securing the same on said axis structure with freedom for up and down flapping and for some swinging movements fore and aft in the rotative path, to accommodate variable forces encountered by the individual wings in flight; means adjacent the root end of each wing limiting at least the downward pivotation of the wings on their horizontal pivots; means adjacent the root end of each wing controlling the swinging of the wings on their vertical pivots; and the wing structure being of greater stiffness in the root end portion than in an outer portion.

19. An aircraft sustaining rotor of the pivotally or oscillatively mounted wing type, having a rotative hub structure, a wing connection member, wing means pivotally attached to the hub structure through said member on at least two relatively angled axes, one of which forms a point of attachment between said member and the wing means and another a point of attachment between said member and the hub, and means for restricting a pivotal wing movement arranged to cooperate with and react against said member at a point between the points of attachment of said member to the wing means and to the hub structure.

20. An autorotative aircraft sustaining rotor construction including a plurality of relatively long sustaining wings or blades, an axis structure incorporating a normally freely rotatable hub member arranged upon a rotor mount to provide rotation of the hub member about a substantially upright axis, substantially horizontal pivot means for connecting each wing with the hub member and providing for substantially independent swinging movements of the wings in a direction generally transverse their rotative path of travel, in which construction, in normal translational flight of the craft, the flow of air across the wings serves to rotate them about said upright axis and in which the pivot means permit the wings to swing to different positions at different points in the circle of rotation under the influence of variable lift and other forces encountered at different points in the circle of rotation, and supporting mechanism for the wings including co-operating stop means or abutment surfaces on the hub member and wing roots and adapted to arrest downward swinging movement of the wings when they are not rotating at flight speed, the stop means or abutment surfaces being so positioned or spaced away from each other when the wings are rotating in flight operation that their relative clearance is slightly greater than required to accommodate the normal maximum downward swinging movements of the wings normally encountered in translational flight operation of the craft, whereby freedom for force-compensating wing-swinging movements is provided in flight and yet an adequate support for the relatively long wings is provided from their root ends when they are at rest.

21. An autorotative aircraft sustaining rotor construction including a plurality of relatively long sustaining wings or blades, an axis structure incorporating a normally freely rotatable hub member arranged upon a rotor mount to provide rotation of the hub member about a substantially upright axis, substantially horizontal pivot means for connecting each wing with the hub member and providing for substantially independent swinging movements of the wings in a direction generally transverse their rotative path of travel, in which construction, in normal translational flight of the craft, the flow of air across the wings serves to rotate them about said upright axis and in which the pivot means permit the wings to swing to different positions at different points in the circle of rotation under the influence of variable lift and other forces encountered at different points in the circle of rotation, supporting mechanism for the wings including co-operating stop means or abutment surfaces on the hub member and wing roots adapted to arrest downward swinging movement of the wings when they are not rotating at flight speed, the stop means or abutment surfaces being so positioned or spaced away from each other when the wings are rotating in flight operation that their relative clearance is slightly greater than required to accommodate the normal maximum downward swinging movements of the wings normally encountered in translational flight operation of the craft, whereby freedom for force-compensating wing-swinging movements is provided in flight and yet an adequate support for the relatively long wings is provided from their root ends when they are at rest, and additional stop devices or abutment surfaces on the hub member and wing roots and adapted to arrest upward swinging movement of the wings when they are not rotating at flight speed, the additional stop devices being so positioned or spaced away from each other when the wings are rotating in flight operation that their relative clearance is slightly greater than the maximum upward swinging movements of the wings normally encountered in translational flight operation of the craft, whereby freedom for normal upward swinging movements of the wings is preserved and yet an adequate restraint at the root ends of the wings is provided as against excessive upward swinging of the wings when they are not rotating at flight speeds.

22. In an aircraft having a sustaining rotor, an axis structure, a sustaining blade pivoted thereto, and pivot joint parts including a pair of pivot pins, one extended generally vertically and the other extended generally horizontally, and a block apertured to receive said pins, together with a stop device mounted on said block and arranged to limit abnormal movements of the blade about at least one of said pivot axes.

23. In an autorotative sustaining rotor of the character described, an upright normally freely rotative hub, an elongated aeroform wing positioned for rotation about the axis of the hub under the influence of relative air-flow, the wing construction at least in the portion near the hub being of sufficient rigidity that the wing in its entirety may be supported by its root end as against breaking or bending down to a position of interference with other parts of the craft, a flight articulation pivot for the wing having its axis substantially transverse the longitudinal axis of the wing and lying in a plane which is substantially perpendicular to the hub axis whereby freedom for up-and-down flapping of the wing under the influence of variable flight forces is provided, a second pivot for the wing having its axis at an angle to the longitudinal axis of the wing and intersecting the said plane whereby freedom for at least some swinging of the wing forwardly and rearwardly in its general rotative path is provided, the said two pivots serving to mount the root of the wing on the hub, stop or control means located adjacent the root of the wing for limiting the range of such swinging on said second-named pivot, and stop or support means also adjacent the root of the wing positioned to co-operate with the hub for limiting at least the downward movement of the wing on said first-named pivot to support the wing by its root end as against interference with other parts of the craft when not rotating at full flight speed, the stop means being positioned to provide clearance for normal wing movements in flight.

24. In an autorotative sustaining rotor of the character described, an upright normally freely rotative hub, an elongated aeroform wing positioned for rotation about the axis of the hub under the influence of relative air-flow, the wing construction at least in the portion near the hub being of sufficient rigidity that the wing in its entirety may be supported by its root end as against breaking or bending down to a position of interference with other parts of the craft, a flight articulation pivot for the wing having its axis substantially transverse the longitudinal axis of the wing and lying in a plane which is substantially perpendicular to the hub axis whereby freedom for up-and-down flapping of the wing under the influence of variable flight forces is provided, a second pivot for the wing having its axis at an angle to the longitudinal axis of the wing and intersecting the said plane whereby freedom for at least some swinging of the wing forwardly and rearwardly in its general rotative path is provided, the said two pivots serving to mount the root of the wing on the hub, stop or control means located adjacent the root of the wing for limiting the range of such swinging on said second-named pivot, and stop or support means also adjacent the root of the wing positioned to co-operate with the hub for limiting at least the downward movement of the wing on said first-named pivot to support the wing by its root end as against interference with other parts of the craft when not rotating at full flight speed, the stop means being positioned to provide clearance for normal wing movements in flight, and cushion means co-operating with at least one of the stop means.

JUAN DE LA CIERVA.